US012688651B2

(12) United States Patent
Dash et al.

(10) Patent No.: US 12,688,651 B2
(45) Date of Patent: Jul. 21, 2026

(54) METHOD AND SYSTEM FOR THREE-DIMENSIONAL MERCHANDISING AND SPACE PLANNING

(71) Applicant: Tata Consultancy Services Limited, Mumbai (IN)

(72) Inventors: Priyanka Dash, Chennai (IN); Paul Singh, Chennai (IN); Balamurali Venkatesan, Chennai (IN); Rajapriya Mariappan, Chennai (IN); Sundar Ramakrisnan, Chennai (IN); Richard Neiel, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 149 days.

(21) Appl. No.: 18/827,972

(22) Filed: Sep. 9, 2024

(65) Prior Publication Data

US 2025/0139897 A1    May 1, 2025

(30) Foreign Application Priority Data

Oct. 25, 2023    (IN) .............................. 202321072614

(51) Int. Cl.
  *G06T 17/20*       (2006.01)
  *G06Q 10/067*      (2023.01)
       (Continued)
(52) U.S. Cl.
  CPC ........... *G06T 17/20* (2013.01); *G06Q 10/067* (2013.01); *G06T 15/04* (2013.01); *G06T 15/20* (2013.01); *G06T 2210/04* (2013.01)

(58) Field of Classification Search
  None
  See application file for complete search history.

(56) References Cited

U.S. PATENT DOCUMENTS 7,440,903 B2 * 10/2008 Riley ................. G06Q 30/0601
                                                    705/28
7,463,143 B2 * 12/2008 Forr ...................... G06Q 30/00
                                                    340/520

(Continued)

FOREIGN PATENT DOCUMENTS

WO      WO 2014/049305 A1      4/2014

*Primary Examiner* — Jason A Pringle-Parker
(74) *Attorney, Agent, or Firm* — Finnegan, Henderson, Farabow, Garrett & Dunner, LLP

(57)                ABSTRACT

This disclosure relates generally to a method and system for three-dimensional (3D) merchandising and space planning. State-of-the-art methods providing the merchandising and space planning for store management in three-dimensional visualization is limited to a specific fixture or to a specific area of the store. However, planning the merchandising and the space for an entire store in three-dimensional hyper-realistic visualization is not yet done. The disclosed method provides three-dimensional hyper-realistic visualization for planning the merchandize and space for an entire store by integrating data analytics capturing real-time information required during planning, and the in-house libraries facilitating quicker and easier design of the layouts for the store. The method includes importing the products from the product library, receiving real-time performance analytics for the products, and creating layout by placing the products on the fixtures imported from the fixture library.

15 Claims, 12 Drawing Sheets

(51) Int. Cl.
    *G06T 15/04*         (2011.01)
    *G06T 15/20*         (2011.01)

(56)         References Cited

U.S. PATENT DOCUMENTS

| | | | | |
|---|---|---|---|---|
| 7,685,023 | B1 * | 3/2010 | Abraham | G06Q 30/0603 |
| | | | | 705/27.2 |
| 8,295,542 | B2 * | 10/2012 | Albertson | G06V 40/20 |
| | | | | 382/103 |
| 9,307,368 | B1 * | 4/2016 | Bartlett | G01S 5/02525 |
| 9,336,508 | B2 * | 5/2016 | Soon-Shiong | G06Q 30/0643 |
| 11,049,120 | B2 * | 6/2021 | Garel | G06Q 30/0201 |
| 11,615,430 | B1 * | 3/2023 | Sharma | G06Q 30/0201 |
| | | | | 705/7.29 |
| 2004/0111454 | A1 * | 6/2004 | Sorensen | G06Q 30/0201 |
| | | | | 708/200 |
| 2006/0010028 | A1 * | 1/2006 | Sorensen | G06Q 30/02 |
| | | | | 705/7.29 |
| 2011/0029997 | A1 * | 2/2011 | Wolinsky | G06Q 30/0201 |
| | | | | 725/12 |
| 2011/0276364 | A1 * | 11/2011 | Bergstrom | G06Q 10/04 |
| | | | | 705/7.29 |
| 2012/0223943 | A1 | 9/2012 | Williams et al. | |
| 2012/0270573 | A1 * | 10/2012 | Marti | G01C 21/3602 |
| | | | | 455/457 |
| 2013/0054310 | A1 * | 2/2013 | Sickenius | G06Q 30/02 |
| | | | | 705/7.39 |
| 2013/0275277 | A1 * | 10/2013 | Mihic | G06Q 10/04 |
| | | | | 705/28 |
| 2013/0317950 | A1 * | 11/2013 | Abraham | G06Q 30/06 |
| | | | | 705/27.1 |
| 2014/0045515 | A1 * | 2/2014 | Austin | H04W 4/02 |
| | | | | 455/456.1 |
| 2014/0278742 | A1 * | 9/2014 | MacMillan | G06Q 30/0201 |
| | | | | 705/7.29 |
| 2015/0088701 | A1 * | 3/2015 | Desmarais | G06Q 10/087 |
| | | | | 705/28 |
| 2017/0228686 | A1 | 8/2017 | Bermudez Rodriguez et al. | |
| 2018/0005035 | A1 * | 1/2018 | Bogolea | G06V 20/20 |
| 2020/0380439 | A1 | 12/2020 | Fanourgiakis et al. | |

* cited by examiner

400

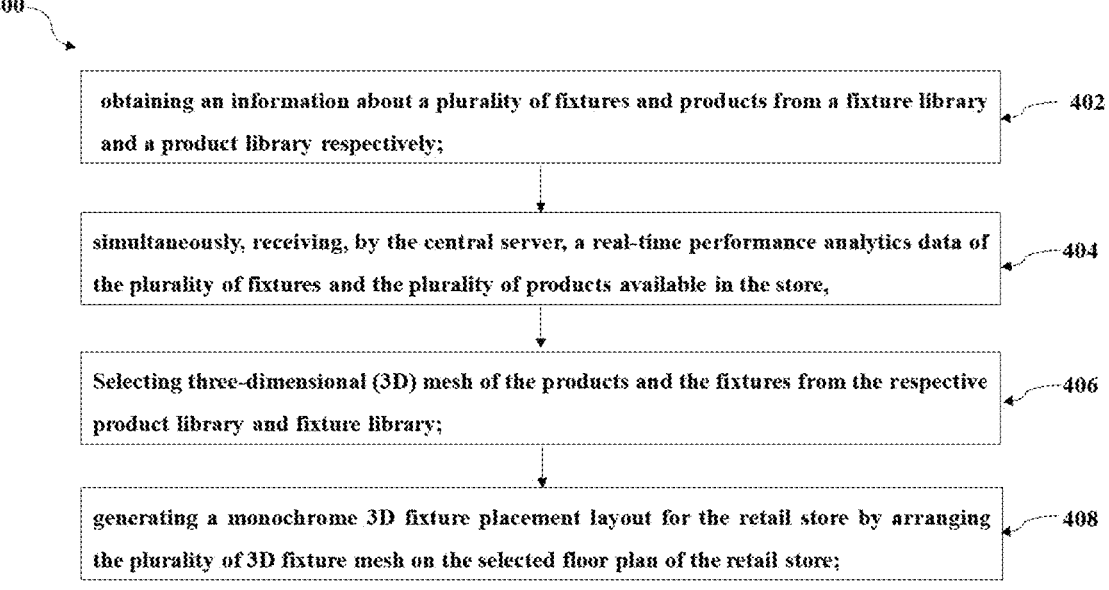

obtaining an information about a plurality of fixtures and products from a fixture library and a product library respectively;    — 402 simultaneously, receiving, by the central server, a real-time performance analytics data of the plurality of fixtures and the plurality of products available in the store,    — 404

Selecting three-dimensional (3D) mesh of the products and the fixtures from the respective product library and fixture library;    — 406 generating a monochrome 3D fixture placement layout for the retail store by arranging the plurality of 3D fixture mesh on the selected floor plan of the retail store;    — 408

FIG. 4A

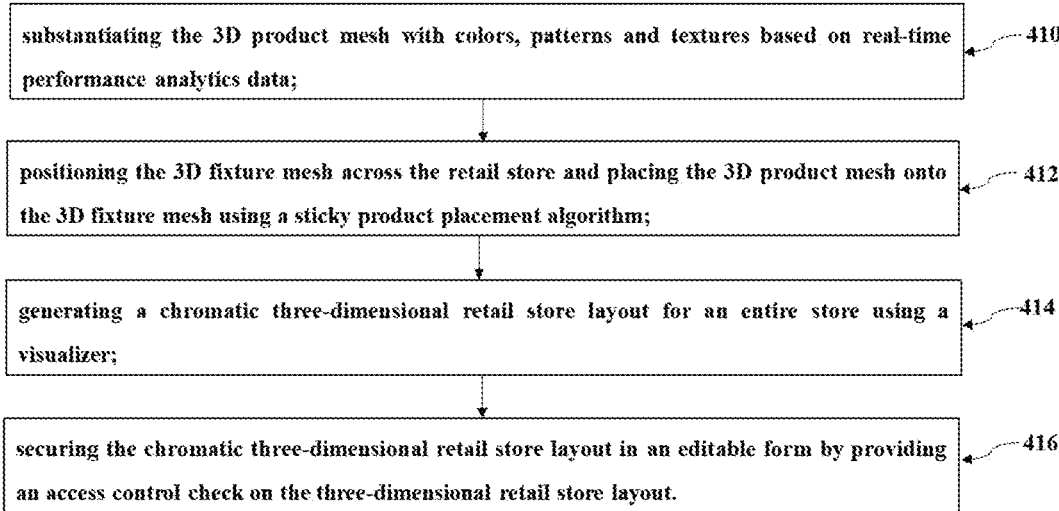

substantiating the 3D product mesh with colors, patterns and textures based on real-time performance analytics data;                                                                                     — 410 positioning the 3D fixture mesh across the retail store and placing the 3D product mesh onto the 3D fixture mesh using a sticky product placement algorithm;                                               — 412 generating a chromatic three-dimensional retail store layout for an entire store using a visualizer;                                                                                                     — 414 securing the chromatic three-dimensional retail store layout in an editable form by providing an access control check on the three-dimensional retail store layout.                                      — 416

FIG. 4B

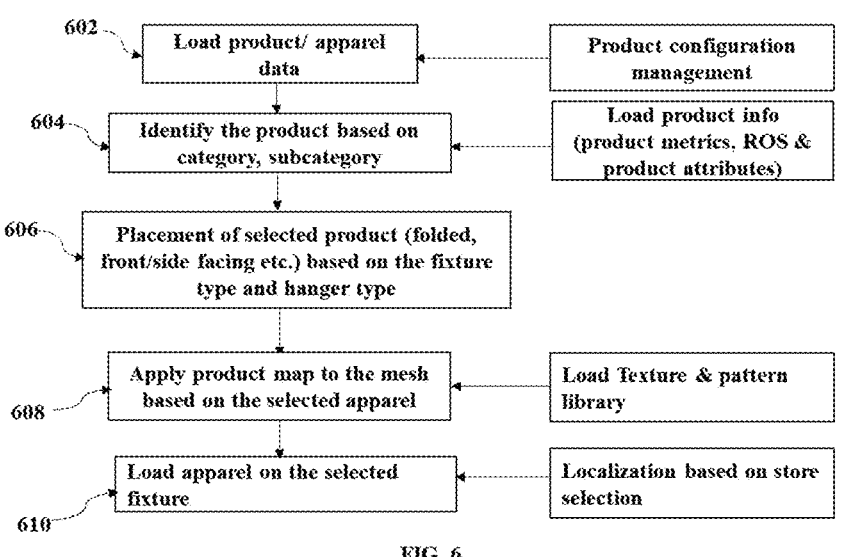

602 — Load product/ apparel data

Product configuration management

604 — Identify the product based on category, subcategory

Load product info (product metrics, ROS & product attributes)

606 — Placement of selected product (folded, front/side facing etc.) based on the fixture type and hanger type 608 — Apply product map to the mesh based on the selected apparel Load Texture & pattern library 610 — Load apparel on the selected fixture Localization based on store selection

FIG. 6

METHOD AND SYSTEM FOR THREE-DIMENSIONAL MERCHANDISING AND SPACE PLANNING

PRIORITY CLAIM

This U.S. patent application claims priority under 35 U.S.C. § 119 to: Indian Patent Application number 202321072614, filed on Oct. 25, 2023. The entire contents of the aforementioned application are incorporated herein by reference.

TECHNICAL FIELD

The embodiments herein generally relate to the field of a three-dimensional (3D) merchandising space planning and, more particularly, to a method and system for generating g three-dimensional layouts for merchandising and space planning.

BACKGROUND

Historically, product placement in a retail store has varied according to the demographics of the population that visits the store. There is currently no mechanism for designing a retail store on a world-side basis that provides a consistent shopping experience to a consumer. The product placement in a retail store is a dynamic activity, especially in fashion stores. Retailers often arrange the inventories based on season, occasion, competition in order to grab customer attention. Traditional retail space planning laid out the placement of fixtures and items within the store using software that displays the design layout in two dimensions on a computer screen. However, merchandizers or the one creating store layouts may have difficulty envisioning what the final result would be when physically built out. Thus, the challenge is to create interfaces to computers which are as close to the real world as possible. Industry has been working towards this challenge and there is presently a relatively high degree of realism possible in interfaces. This presents a need and an opportunity for even more realistic interaction techniques to better match the visual metaphors used and to achieve a higher level of ease of use for computer systems. Some solutions have been developed to better communicate a design layout to merchandizers or retail space planners. One solution is to provide a three-dimensional ("3D") perspective rendering of the space in space planning software so that the retail space looks like a photograph and includes perspective views of the space from different angles. Available 3D solutions provide perspective view of a specific space. Some of the available virtual reality solutions provide visualization, however, the layout cannot be edited. Visualizing the entire shop floor in 3D and planning a layout of the entire shop floor remain unaddressed. Apart from an inadequacy in providing perspective view, the existing solutions lack integrated analytics with respect to capacity and inventory information which makes it mandatory for the merchandiser to refer to other sources of performance information and then plan the entire space.

Embodiments of the present disclosure present technological improvements as solutions to one or more of the above-mentioned technical problems recognized by the inventors in conventional systems. For example, in one embodiment, a method for three-dimensional merchandizing and space planning of retail store is provided. The method includes acquiring, via one or more hardware processors, a floor plan of the retail store. The floor plan of various retail stores belonging to a specific group of retail stores are accessible through a server via network. The method further includes obtaining, via one or more hardware processors, an information about a plurality of fixtures and products from a fixture library and a product library respectively. The retail and space planning module of the system obtains a fixture information about a plurality of fixtures from a fixture library wherein the fixture information comprises attributes, capacity and usage detail of each of the plurality of fixtures. The retail and space planning module of the system obtains a product information about a plurality of products from a product library wherein the product information comprises of attributes, key performance indicators and quantity of each product among the plurality of products. The method further includes, simultaneously receiving, by a central server, via one or more hardware processors, a real-time performance analytics data of the plurality of fixtures available in the store; and a real-time performance analytics data of the plurality of products in the store. The data analytics module of the system generates real-time performance analytics of the product and fixtures onto which the products are kept in the retail store. The data analytics module facilitates real-time analytics during layout planning phase. The method further includes importing, via one or more hardware processors, a 3D mesh of the plurality of products and the plurality of fixtures from the respective product library and the fixture library. The 3D mesh are dummies of plurality of products and fixtured that can be colored or textured as per the inventory to be arranged in the retail store. The method further includes generating, via one or more hardware processors, a three-dimensional fixture placement layout for the retail store by arranging the plurality of 3D fixture mesh on the selected floor plan of the retail store, wherein the 3D fixture mesh selection is based on acquired real-time performance analytics data of the performance of the 3D fixtures. The method further includes substantiating, via one or more hardware processors, the imported 3D product mesh to be placed onto the three-dimensional fixtures, by colors, patterns, and textures based on real-time performance analytics data of the performance of the 3D products. The method further includes loading, via one or more hardware processors the substantiated 3D products onto 3D fixtures using sticky placement algorithm. The method further includes generating, via one or more hardware processors, the three-dimensional retail store layout for an entire store using a visualizer. The retail and space planning module generates the three-dimensional retail store layout for an entire store and the visualizer integrated to the retail and space planning module provide plurality of views e.g. bird eye view, drone view and first-person view. The method further includes securing, via one or more hardware processors, the 3D retail store layout in an editable form by providing an access control check on the 3D retail store layout. The three-dimensional layout generated is saved in the retail and space planning module in an editable form and can be edited and published based on access given by user/merchandizer created the three-dimensional layout.

In another aspect, a system for three-dimensional merchandizing and space planning of retail store is provided. The system includes at least one memory storing programmed instructions; one or more Input/Output (I/O) interfaces; and one or more hardware processors, a data analytics module and a retail and space planning module, operatively coupled to a corresponding at least one memory, wherein the system is configured to acquire, via one or more hardware processors, a floor plan of the retail store. The floor plan of various retail stores belonging to a specific group of retail stores are accessible through a server via network. Further, the system is configured to obtain, via one or more hardware processors, an information about a plurality of fixtures and products from a fixture library and a product library respectively. The retail and space planning module of the system obtains a fixture information about a plurality of fixtures from a fixture library wherein the fixture information comprises attributes, capacity and usage detail of each of the plurality of fixtures. The retail and space planning module of the system obtains a product information about a plurality of products from a product library wherein the product information comprises of attributes, key performance indicators and quantity of each product among the plurality of products. Further, the system is configured to simultaneously receive, by a central server, via one or more hardware processors, a real-time performance analytics data of the plurality of fixtures available in the store; and a real-time performance analytics data of the plurality of products in the store. The data analytics module of the system generates real-time performance analytics of the product and fixtures onto which the products are kept in the retail store. The data analytics module facilitates real-time analytics during layout planning phase. Further, the system is configured to import, via one or more hardware processors, a 3D mesh of the plurality of products and the plurality of fixtures from the respective product library and the fixture library. The 3D mesh are dummies of plurality of products and fixtured that can be colored or textured as per the inventory to be arranged in the retail store. Further, the system is configured to generate, via one or more hardware processors, a three-dimensional fixture placement layout for the retail store by arranging the plurality of 3D fixture mesh on the selected floor plan of the retail store, wherein the 3D fixture mesh selection is based on acquired real-time performance analytics data of the performance of the 3D fixtures. Further, the system is configured to substantiate, via one or more hardware processors, the imported 3D product mesh to be placed onto the three-dimensional fixtures, by colors, patterns, and textures based on real-time performance analytics data of the performance of the 3D products. Further, the system is configured to load, via one or more hardware processors the substantiated 3D products onto 3D fixtures using sticky placement algorithm. Further, the system is configured to generate, via one or more hardware processors, the three-dimensional retail store layout for an entire store using a visualizer. The retail and space planning module generates the three-dimensional retail store layout for an entire store and the visualizer integrated to the retail and space planning module provide plurality of views e.g. bird eye view, drone view and first-person view. Further, the system is configured to secure, via one or more hardware processors, the 3D retail store layout in an editable form by providing an access control check on the 3D retail store layout. The three-dimensional layout generated is saved in the retail and space planning module in an editable form and can be edited and published based on access given by user/merchandizer created the three-dimensional layout.

In yet another aspect, a computer program product including a non-transitory computer-readable medium having embodied therein a computer program for three-dimensional merchandizing and space planning of retail store is provided. The computer readable program, when executed on a computing device, causes the computing device to acquire, via one or more hardware processors, a floor plan of the retail store. The floor plan of various retail stores belonging to a specific group of retail stores are accessible through a server via network. The computer readable program, when executed on a computing device, causes the computing device to obtain, via the one or more hardware processors, an information about a plurality of fixtures and products from a fixture library and a product library respectively. The retail and space planning module of the system obtains a fixture information about a plurality of fixtures from a fixture library wherein the fixture information comprises attributes, capacity and usage detail of each of the plurality of fixtures. The retail and space planning module of the system obtains a product information about a plurality of products from a product library wherein the product information comprises of attributes, key performance indicators and quantity of each product among the plurality of products. The computer readable program, when executed on a computing device, causes the computing device to simultaneously receive, by a central server, via one or more hardware processors, a real-time performance analytics data of the plurality of fixtures available in the store; and a real-time performance analytics data of the plurality of products in the store. The data analytics module of the system generates real-time performance analytics of the product and fixtures onto which the products are kept in the retail store. The data analytics module facilitates real-time analytics during layout planning phase. The computer readable program, when executed on a computing device, causes the computing device to import, via the one or more hardware processors a 3D mesh of the plurality of products and the plurality of fixtures from the respective product library and the fixture library. The 3D mesh are dummies of plurality of products and fixtured that can be colored or textured as per the inventory to be arranged in the retail store. The computer readable program, when executed on a computing device, causes the computing device to generate, via the one or more hardware processors, a three-dimensional fixture placement layout for the retail store by arranging the plurality of 3D fixture mesh on the selected floor plan of the retail store, wherein the 3D fixture mesh selection is based on acquired real-time performance analytics data of the performance of the 3D fixtures. The computer readable program, when executed on a computing device, causes the computing device to substantiate, via the one or more hardware processors, the imported 3D product mesh to be placed onto the three-dimensional fixtures, by colors, patterns, and textures based on real-time performance analytics data of the performance of the 3D products. The computer readable program, when executed on a computing device, causes the computing device to load, via the one or more hardware processors the substantiated 3D products onto 3D fixtures using sticky placement algorithm. The computer readable program, when executed on a computing device, causes the computing device to generate, via the one or more hardware processors the three-dimensional retail store layout for an entire store using a visualizer. The retail and space planning module generates the three-dimensional retail store layout for an entire store and the visualizer integrated to the retail and space planning module provide plurality of views e.g. bird eye view, drone view and first-person view. The computer readable program, when executed on a computing device, causes the computing device to secure, via the one or more hardware processors, the 3D retail store layout in an editable form by providing an access control check on the 3D retail store layout. The three-dimensional layout generated is saved in the retail and space planning module in an editable form and can be edited and published based on access given by user/merchandizer created the three-dimensional layout.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4A and 4B illustrates a method of three-dimensional (3D) merchandising and space planning implemented by the system of FIG. 1, in accordance with some embodiments of the present disclosure.

FIG. 6 illustrates a process flow of a product management approach used by the system of FIG. 1, in accordance with some embodiments of the present disclosure.

DETAILED DESCRIPTION

Figure 1:
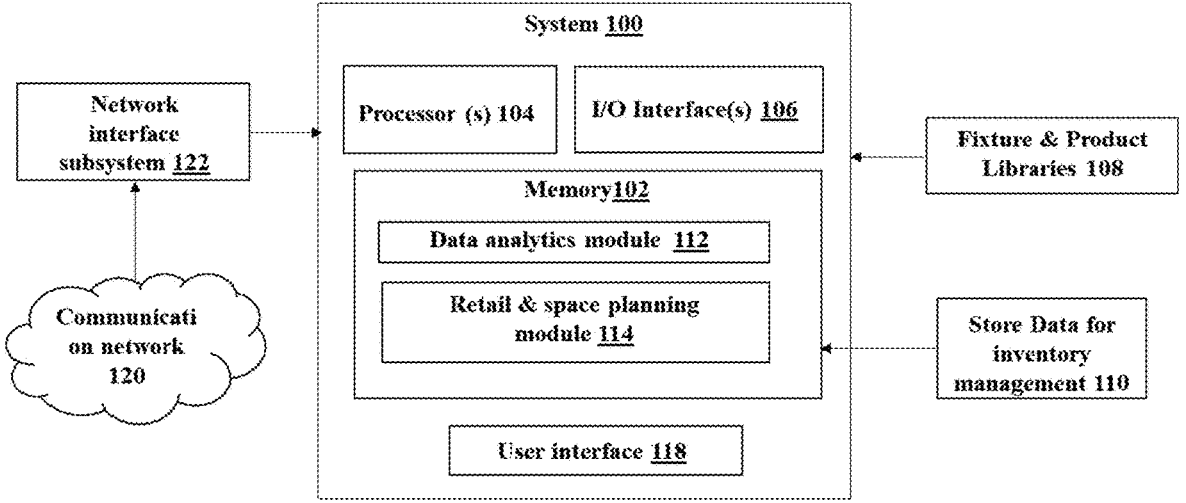
FIG. 1 illustrates a functional block diagram of a system for three-dimensional merchandising and space planning, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

It is a no brainer how quickly merchandise keeps changing at a retail store. Especially, fashion stores, merchandize changes very quickly under the influence of internal as well as external factors. The internal factors contributing dynamics involved in merchandize placements are planograms, internal guidelines provided to the stores, sales etc and the external factors contributing dynamics are competition, offers, advertisements, buying behaviors, season, festivals etc. The system disclosed in the present invention provides a three-dimensional visualization of the merchandize along with an integration of all real-time performance analytics, capacity information, inventory availability necessary for quick and informative decision making of the merchandiser. The integration of the above information assists the merchandizer/user to do planning based on real-time inputs. Such plans are much faster to publish and much more efficient, as the user/merchandiser can consider product and aisle performance analytics and even forecast while placing a product on the plan. The system provides the user/merchandiser to design the entire shop floor in one go using libraries for fixtures and libraries for merchandise to be placed. This circumvents planning or publishing the plans in parts capturing an aisle, or a fixture or some specific area in the store and then combining the parts to generate entire store plan.

The embodiments herein provide a method and system for three-dimensional merchandising and space planning. The planning modules of the system for merchandizing and space are integrated to receive real-time analytics for efficient store management. The system for three-dimensional merchandising and space planning provides editable layouts with various levels of access control making it more advanced than a conventional planograms.

The system disclosed herein provides an interface for three-dimensional merchandizing and retail space planning or modelling a physical space and 3D virtual objects or modelling physical objects in the real world. Such objects can include, for example, shelves or other fixtures, items to go on the shelves, lighting, displays, structures, flooring, information displays, checkout lanes, cash registers, and so forth. The interface allows the user to interact with 3D virtual objects to move them around the retail space or arrange them in a particular way. As the user interacts with the 3D virtual objects, the display/visualizer is updated to give the user the sense of arrangements made by the user.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a functional block diagram of a system for three-dimensional merchandising and space planning, in accordance with some embodiments of the present disclosure.

In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like. The I/O interface(s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) 106 can include one or more ports for connecting a number of devices to one another or to another server. The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the system 100 includes planning module 114 and data analytics module 112, functionally connected to network for receiving real time analytics. In an embodiment, the memory 102 may include a database or a repository. The memory 102 may comprise information pertaining to input(s)/output(s) of each step performed by the processor(s) 104 of the system 100 and methods of the present disclosure. In an embodiment, the database may be external (not shown) to the system 100 and coupled via the I/O interface 106. The memory 102 includes the data analytics module 112 which is connected with a network to receive internal as well as external data required for merchandizing and space planning. The real-time analytics supports better merchandising and space planning. The memory 102 further includes the retail and space planning module 114 that provide configurable and editable layouts for product placement as well as fixture placement. The memory 102 further includes a gamified user interface 118 facilitating interaction of the user from the system. The gamified user interface 118 via the I/O interface provides tools for generating three-dimensional arrangement of merchandise on fixtures as well as three-dimensional store layout plans. The gamified user interface 118 is made in a way that the system 100 can be operated by merchandizer with ordinary designing skills. The gamified user interface 118 populates the options for designing a store in much simpler way which are accessible through drag/drop/click/move and the like. The system 100 is functionally connected to fixture and product libraries 108. The fixture and product libraries 108 comprise plurality of fixtures that can be placed in the store as well as type of products/merchandise to be placed in the fixture. The input of store data for inventory management 110 is received by memory 102 to execute data analytics module 112 and retail and space planning module 114. The system 100 is further connected to network interface subsystem 122 linked to the communication network 120 that works to facilitate real-time capture of data required for the data analytics module 112 and also facilitate dissemination of layouts generated from the retail and space planning module 114. The memory 102 further includes plurality of modules (not shown here), which comprise programs or coded instructions that supplement applications or functions performed by the system 100 for executing different steps involved in three-dimensional merchandize and space planning. The plurality of modules, amongst other things, can include routines, programs, objects, components, and data structures, which perform particular tasks or implement particular abstract data types. The plurality of modules may also be used as, signal processor(s), node machine(s), logic circuitries, and/or any other device or component that manipulates signals based on operational instructions. Further, the plurality of modules can be used by hardware, by computer-readable instructions executed by the one or more hardware processors 104, or by a combination thereof. The plurality of modules can include various sub-modules (not shown).

Figure 2:
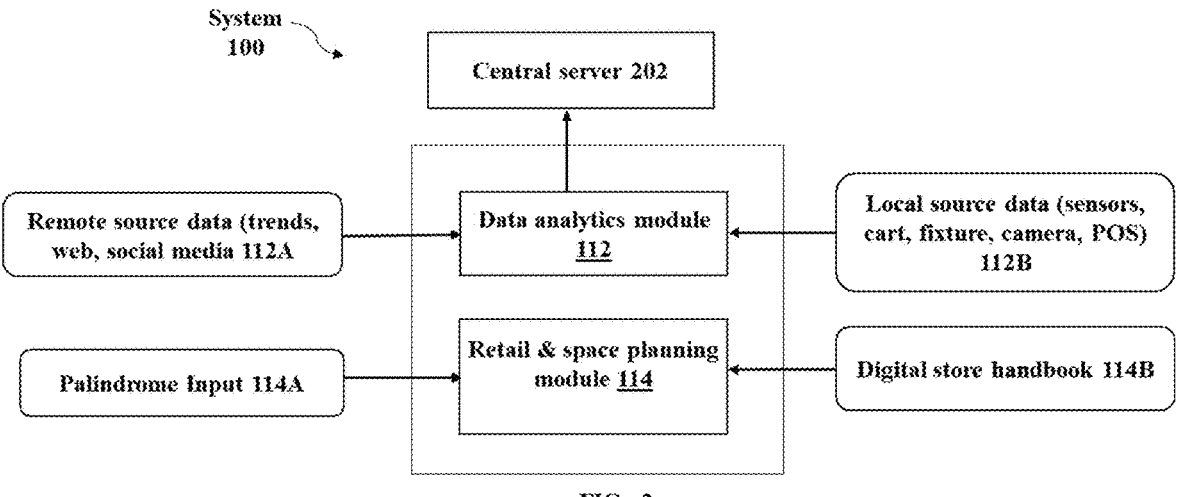
FIG. 2 illustrates an architecture of modules of system of FIG. 1 accountable for data analysis and merchandise planning, in accordance with some embodiments of the present disclosure.

FIG. 2 illustrates an architecture of modules of system of FIG. 1 accountable for data analysis and merchandise planning, in accordance with some embodiments of the present disclosure.

As illustrated in FIG. 2, the data analytics module 112 performs quantitative analysis by considering plurality of sources. The function of the data analytics module 112 is to provide the quantitative analysis of performance of the individual product to be placed in the store. The plurality of sources corresponds, remote source data 112A and local source data 112B accessed by the data analytics module 112. The remote source data 112A can include data acquired from sources outside of or apart from the store, such as data about trends, events, locale details (such as demographic details about a locale in which the store is situated or contemplated, and/or details about a locale identified as similar or otherwise relevant to the store), affiliates (such as data from other stores in a chain, data from suppliers for the store, data of a transactional or other nature from product promotors that wish to invest funds in promoting certain products in the store, etc.), or other factors of interest. In an embodiment, the remote source data 112A may be provided via the internet or other network connection. The local source data 112B can include data acquired from sources within the store. For example, the local source data 112B may include data acquired from sensors such as cameras, sensors on fixtures, sensors on shopping carts or baskets, or other sensors described elsewhere herein. As another example, the local source data 112B may include data from point-of-sale equipment (such as electronic or manual cash registers or other terminals), such as may be useful in determining details such as purchase history of items in the store or other trends or metrics. Although some general examples of possible types of the local source data 112B have been described, the local source data 112B may additionally or alternatively include other forms or types of data described herein. The real-time analytics performed by the data analytics module 112 is stored in the central server 202 which gets updated in real-time. The retail space planning module 114 provides and processes space planning data, as disclosed in more detail below. The retail space planning module 114 can be used to lay out a store selling goods prior to investing in actual fixtures and build out of retail space. As web shopping increases in popularity, physical store retailers may want to provide a unique experience to customers to compete against web retailers. Embodiments allow user/designer to plan their retail space through three-dimensional designing tools to plan in a way that looks compelling to customers. The 3D planning and designing tools are capable of providing immersive mock-ups which provide real experience of the store during designing the layouts. Additionally, the system facilitates alteration and modifications to the layouts created by the user/merchandizer himself or with the one having access to viewing and modifying the plans. The retail space planning module 114A receives inputs from the software palindrome. The input from palindrome is a JSON file for each product comprising dimensions of the product in terms of height, width, and other relevant details. According to another embodiment, other software may also be used for providing inputs to the retail space planning module 114A like JDA Prairie™, BlueYonder™, etc. Further, the retail space planning module 114 receives inputs from digital store handbook 114B. The digital store handbook 114B is a kind of guidebook provided by retail authorities for guiding the user/merchandizer. The digital store handbook 114B comprises of guidelines relevant for fixture arrangements and fixture placement. The user/designer may refer to the guidelines and checkpoints in the digital store handbook 114B and incorporate while preparing the layout. The retail and space planning module 114 retrieves the real-time updates from the central server 202 as and when required for fixture planning and product planning.

Figure 3:
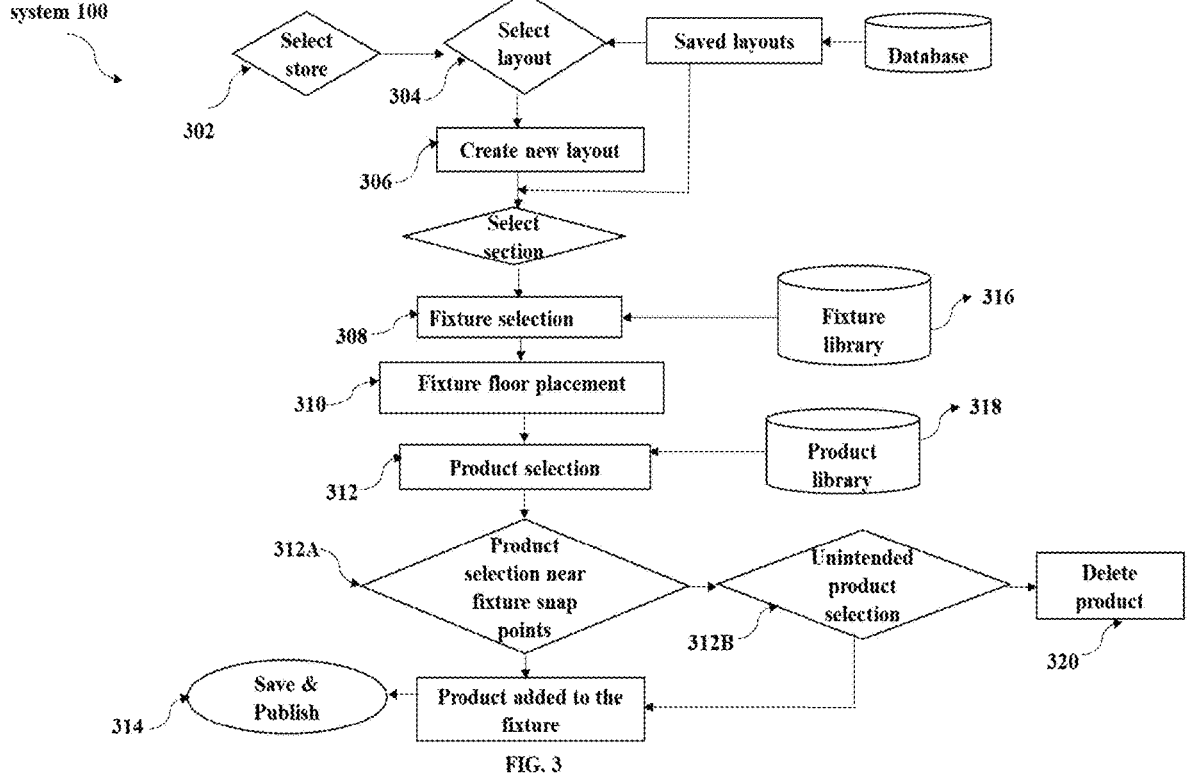
FIG. 3 illustrates a flow diagram of the steps executed for three-dimensional merchandising and space planning by the system, in accordance with some embodiments of the present disclosure.

FIG. 3 illustrates a flow diagram of the steps executed for three-dimensional merchandising and space planning by the system, in accordance with some embodiments of the present disclosure.

The very first option after the user logs in to the system 100 is to select the store at step 302 from the dropdown menu. The system 100 can be governed at a global platform wherein various stores across various geographies may be selected and accordingly layouts can be planned. Based on access control, the layouts of various stores saved in the system may be referred to by the interested user. After selecting the store, the system 100 prompts to select the store layout at step 304. The store layout appears in 3D representation and gets loaded into retail space planning module 114. The store layout can contain information about the store including room layouts, fixture selection and placement, and item selection and placement. Fixture objects and item objects can be loaded as part of providing available base objects for a user to work with to build out the store layout. Store layouts can contain information about the store including room layouts, fixture selection and placement, and item selection and placement. At 304, the user can select a desired store layout from a previously saved file or from database. At 304, the user may select an option to create entire new plan from scratch using fixtures and apparels from the fixtures and apparels available in retail space planning module 114. To create the store layout, fixture selection is to be performed at step 308. The dedicated fixture library 316 plays a very crucial role in the 3D retail space designing it enable the user to get access to the digital versions of a plethora of fixtures with just a click of a button. The fixture library 316 stores a variety of fixtures, thereby making it convenient for the user to find all the standard store fixtures in a single area. Furthermore, the fixture library 316 also stores information like fixture attributes, ideal fixture usage and fixture inventory of the store, thereby helping the user plan better during the floor layout planning phase. The fixture library 316 stores three-dimensional virtual object models of various fixtures relevant to the retails store. The three-dimensional virtual object models can include any type of object or fixture placed in the planning model. Some examples include lighting, flooring, wall coverings, cabinets, shelves, display cases, display racks, furniture, products, carousels, checkout lanes, registers, mannequins, people, machinery, vending machines, and so forth. Anything that exists in the physical world can be available as a 3D virtual object model. 3D virtual object models can be available in a library readily available to the user of the system 100. 3D virtual object models can be loaded from a previously saved planning session and arranged as they were when the planning session was previously saved. Further, the visualizer facilitates fixture placement on the floor in 3D at step 310 to visualize placement of the fixture in the store. The gamified user interface provides an option to freely move and place the fixture within the selected area in the store layout. The user can adjust fixtures, including shelf locations, lighting, flooring, and the like. After selecting fixtures and placing them in the store layout, the system 100 prompts the user to go for product selection at step 312. The step 312 is assisted via a product selection executed by the one or more hardware processors. The product selection module is integrated to a product library 318 comprising 3D meshes of plurality of products retailer has for placement onto the respective fixtures within the store. The 3D meshes are created for representing plurality of products to be placed and each mesh is distinct from the other one, differentiating the one product from the other. The meshes of different types of apparels are different and hence make the mesh unique. E.g. every cut, every type of clothing has unique 3D mesh assigned to it. The 3D meshes are created and stored in the product library 318 and once they are pulled out to be placed onto the fixture, various patterns, colors, textures, etc. can be seamlessly applied to it on the go. The product library 318 not only stores a plurality of products for one-stop access during the floor layout planning phase but, it is also comprising of all information related to the product and is visible to the user along with the product display. The associated product information is like product attribute, key performing indicators of the product and inventory information of the product. This helps the user (or merchandiser) to plan better for the products that must be on display in a specific floor layout, by understanding the attributes and their performance at the store. As the user selects the products to be placed in the layout from the product library 318, the system prompts for product selection near fixture snap points 312A. The product selection near fixture snap points 312A is a unique feature in a way that it just locates the product placement on the store layout but allows the user/merchandizer to actually place the product onto the fixture in a manner similar to the actual placement in the store. The product selection near fixture snap points 312A provides sticky product placement which is a drag-and-drop of fixtures and products on the shopfloor for seamless floor planning, which takes the user friendliness of the solution to another level altogether. The sticky product placement ensures that the product is not just floating around on the screen but is assigned to a specific spot on the fixture of choice. Furthermore, depending on the fixture attribute, the product gets placed accordingly. For example, if it is a shelf on which the user is placing a product (say a shirt), the shirt will get folded and placed. Furthermore, if more shirts are placed on the same shelf, they will get stacked on top of each other. Similarly, if there's a hanging rack fixture in use, product (say shirt) will get hung on a hook. Upon adding more shirts to the hanging rack, shirts will be hung side-by-side or one in front of the other, depending on the type of hanging rack in use. The stick product placement algorithm also enables the product (say shirt) to fold and stack in the rack meant to hold the stack of folded shirts. The system 100 further provides an unintended product selection 312B module that allows the user/merchandizer to review the floor plan before publishing it. The unintended product selection 312B module facilitates removal of unintended or wrong selection by way of dragging and dropping off from the floor plan. The selected product dropped off may be deleted using delete product option 320. Once the store layout is designed, the system 100 further allows the user/merchandizer to execute plurality of options. The user/merchandizer can save the layout and publish it using save and publish module 314. The user/merchandizer can perform edits onto saved layouts by pulling out the last saved layout from the save and publish module 314. The user/merchandizer can clone any of the saved layouts for quicker shop floor planning and further provide edits onto the cloned layout. The system allows to edit even the published layouts, thereby giving the user(s) a chance to make changes even after it has been saved. And due to gamified user interface (UI), the editing is also easy. This feature allows multiple users on the permitted server to review and provide their feedback and/or make changes as per their requirement before making a final roll-out. Therefore, system 100 is able to create hyper-realistic layouts for selected floor plans using modules of the present disclosure.

FIGS. 4A and 4B illustrates a method 400 of three-dimensional (3D) merchandising and space planning, in accordance with some embodiments of the present disclosure.

In an embodiment, the system 100 comprises one or more data storage devices or the memory 102 operatively coupled to the processor(s) 104 and is configured to store instructions for execution of steps of the method 400 by the processor(s) or one or more hardware processors 104. The steps of the method 400 of the present disclosure will now be explained with reference to the components or blocks of the system 100 as depicted in FIG. 1 through FIG. 8. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 402 of the method 400, the one or more hardware processors 104 are configured to obtain an information about a plurality of fixtures and products from a fixture library 316 and the product library 318 respectively. The product library 318 comprises of plurality of products to be placed in the retail stores along with detailed product information. The product library 318 acts as a one-stop access for the floor layout planning phase and comprises of all types of information related to products are made visible to the user/merchandizer, like product attributes, key performance indicators of the product and inventory information of the product. This helps the user (or merchandiser) plan better for the products that must be on display in a specific floor layout, by understanding the attributes and their performance at the store. The fixture library 316 stores a variety fixtures, thereby making it convenient for the user to find all the standard store fixtures in a single area. Furthermore, the fixture library 316 also stores information like fixture attributes, ideal fixture usage and fixture inventory of the store, thereby helping the user plan better during the floor layout planning phase. At step 404 of the method 400, the one or more hardware processors 104 are configured to simultaneously, receive, by the central server, a real-time performance analytics data of the plurality of fixtures available in the store as well as the plurality of product in the store. Retailers are increasingly relying on analytical insights to make decisions related to their footprints, product assortment, merchandising strategies, and suggestive selling. Under the current retail deployment model, data obtained from point-of-sale systems is primarily geared towards inventory control, logistics and accounting practices. Marketing departments across all retailers are relying on transactional data to plan selling. The performance of the product is assessed by aggregating outcomes of plurality of sources responsible for capturing product performance. E.g. a data analysis module may be linked to the point-of-sale (POS) terminal wherein the product performance can be analyzed on real-time basis upon each billing. Similarly, sensors placed at the fixtures may be utilized for identifying fast selling products/merchandise. Moreover, the cameras and CCTV capturing various parts of the store may be utilized to assess customer foot-fall in the specific fixture/aisle or an area in the store. The data analysis module receives video stream from CCTV and generate a plurality of heat maps. The heat maps are color coded graphical representations wherein red color signifies higher foot-fall in specific region of the store and the blue color signifies lesser foot-fall in another region. These heat maps present a visual analysis of what is happening in the shop-floor. The merchandizer may use such kind of heat maps to analyze what are the products being liked and purchased by the customers; and what are the products that are not getting enough response. Based on this analysis merchandizer may take necessary action to improve the sales of the product. At step 406 of the method 400, the one or more hardware processors 104 are configured to select a three-dimensional (3D) mesh of the plurality of fixtures and a three-dimensional mesh of the plurality of products selected from the respective fixture library 316 and the product library 318. The 3D mesh of fixtures is placed in the store layout based on user/merchandizer design. Thereafter, 3D mesh of plurality of products are placed onto 3D mesh of plurality of fixtures. At step 408 of the method 400, the one or more hardware processors 104 are configured to generate a monochrome three-dimensional retail store layout for the retail store using the acquired real-time performance analytics data, and the fixture information using 3D fixture mesh. This step is executed by using retail and space planning module 114, wherein the selected fixtures are imported from the fixture library 316 and placed in the store layout in 3D. The gamified user interface allows to move freely, the imported fixtures within the selected area of the store to generate the three-dimensional retail store layout for the retail store. In the general scenario, fixture color or pattern remains similar and does not change quite often. However, the system 100 allows to substantiate the fixture mesh with plurality of colors and patterns. Therefore, chromatic 3D placement of fixtures can also be prepared using the retail and space planning module 114. Therefore, the three-dimensional fixture placement layout may be generated in monochrome using 3D fixture mesh imported from the fixture library or can be generated in a chromatic theme wherein the 3D fixture mesh are substantiated with plurality of colors, patterns and textures after importing the 3D fixture mesh from the fixture library. At step 410 of the method 400, the one or more hardware processors 104 are configured to substantiate the product mesh with colors, patterns and textures based on real-time performance analytics data retrieved from the central server 202. While substantiating 3D product mesh, the user/merchandizer receives the real-time information about availability and performance from the data analytics module 112. At step 412 of the method 400, the one or more hardware processors 104 are configured to load the 3D product mesh onto the 3D fixture mesh using a sticky product placement algorithm. The sticky product placement algorithm ensures the products/merchandise are placed on the 3D assets neatly and only where intended. Their orientation is also determined during the planning stage, so that further confusion can be reduced. For e.g.: some apparel needs to be front facing, some side facing and some folded on a shelf. Sticky product placement places the apparel exactly as per the fixture. Using the sticky product placement algorithm doesn't require additional codes to fix the products onto fixtures. At step 414 of the method 400, the one or more hardware processors 104 are configured to generate the three-dimensional retail store layout for an entire store using a visualizer. The visualizer of the store may incorporate a virtual representation of the store that may show the configuration and/or layout of physical elements of the store, mostly the fixtures and the products. The virtual representation can show shelving, other fixtures, and/or products and indicate positioning and/or other information. The visualizer or other store configuration data may be updated to reflect changes in store item data which is integrated to the data analytics module. The store configuration data and/or the store item data may be updated at any suitable time interval (including continuously, e.g., "real-time"). Frequent updating may provide timely access to information that can allow changes to be made much more quickly than in conventional retail stores lacking systems described herein. At step 416 of the method 400, the one or more hardware processors 104 are configured to secure the three-dimensional retail store layout in an editable form by providing an access control check on the three-dimensional retail store layout. The user/merchandizer can save the layout and publish it using save and publish module. The user/merchandizer can perform edits onto saved layouts by pulling out the last saved layout from the save and publish module. The user/merchandizer can clone any of the saved layouts for quicker shop floor planning and further provide edits onto the cloned layout. The layout once generated and saved, can still be edited, thereby giving the user(s) a chance to make changes even after it has been saved. And due to gamified user interface (UI), the editing is also easy. This feature allows multiple users on the permitted server to review and provide their feedback and/or make changes as per their requirement before making a final roll-out.

Figure 5:
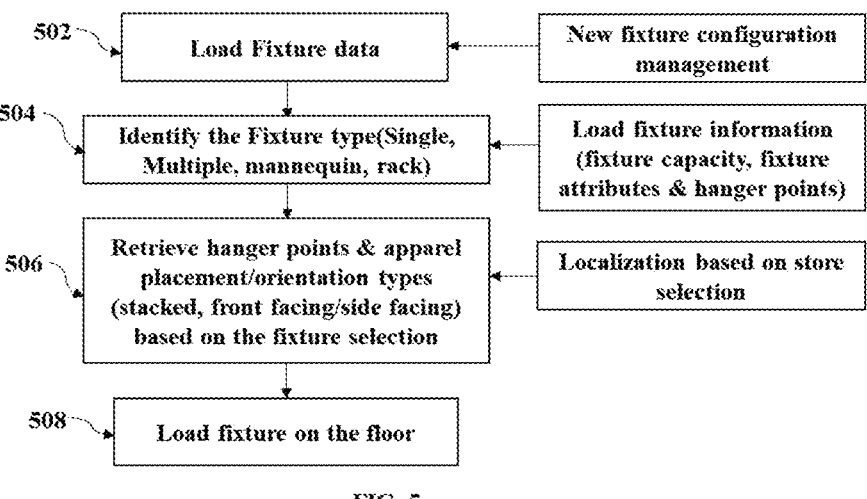
FIG. 5 illustrates a process flow of a technique of fixture management utilized by the system of FIG. 1, in accordance with some embodiments of the present disclosure.

FIG. 5 illustrates a process flow of a technique of fixture management utilized by the system of FIG. 1, in accordance with some embodiments of the present disclosure.

As illustrated in FIG. 5, the retail and space planning module 114 has a sub-module, i.e. fixture configuration management. The fixture configuration management sub-module has an integrated fixture library which comprises of plurality of fixtures to be placed in the retail store. The fixtures are of various types, especially the ones which are required for holding the products, e.g. shelves, racks, mannequin, or hangers. The fixture library stores three-dimensional virtual object models of various fixtures relevant to the retails store. The three-dimensional virtual object models can include any type of object or fixture placed in the retail and space planning module 114. As the user selects the fixture configuration management at the step 502, the fixture data gets loaded from the backend fixture library. The user is then prompted to identify the fixture type (such as shelves, racks, mannequin, hangers etc.) at the step 504. While navigating through the fixture library, the user gets exposed to the plurality of fixtures, the fixture related information stored in the fixture library 316 also popped-up along with the fixture. At the step 506, the user is prompted to select the placement and the orientation of the selected fixture such as direction of placement (front side/back side/stacked etc.). The gamified user interface of the retail space planning module 114 allows free movement of the fixture anywhere within the floor of the selected store in a drag-and-drop manner. In the step 508, the selected fixture gets loaded on the floor based on the selection of the fixture and its orientation/direction.

FIG. 6 illustrates a process flow of a product management approach used by the system of FIG. 1, in accordance with some embodiments of the present disclosure.

FIG. 6 illustrates the method of product management by referring to the product as an apparel. The retail and space planning module 114 has a sub-module, i.e. product configuration management. The product configuration management sub-module has an integrated product library which comprises of plurality of products to be placed in the retail store. The products are of various types, e.g. when the retail store is an apparel store, the product varies from women's wear, men's wear, kids wear with umpteen number of types and designs. The method of product management is explained here considering the product as an apparel. The product (apparel) library comprises of product information that includes an information about product attribute as well as its performance related data. The performance-related data is imported through the data analytics module and stored in the product library on a real-time basis. At the step 602, the product configuration management module loads the product data which is an information about apparels stored in the product library. In the step 604, apparels are identified based on category and sub-category. Once the user selects the product (apparel) while navigating through category and sub-category type, product information gets loaded. At step 606, the user is prompted to select the placement of the selected apparel (such as folded/hanged/rolled etc.). At step 608, the texture and patterns library are imported, and user is allowed to select the respective color, texture, and the pattern. Up to step 608, the selected apparel appears in the form of a 3D mesh onto which respective color, texture, and the pattern are applied. The user interface of the retail space planning module allows free movement of the apparel anywhere within the selected fixture of the selected store in a drag-and-drop manner. The apparel placement is supported by the sticky placement algorithm that allows the user to place the apparel in the same manner it is to be placed in the store. In the step 610, the selected apparel gets loaded on the respective fixture.

FIGS. 7A-7D illustrate various way of positioning the product by way of sticky product placement module, in accordance with some embodiments of the present disclosure.

Figures 7A, 7B, 7C, 7D:
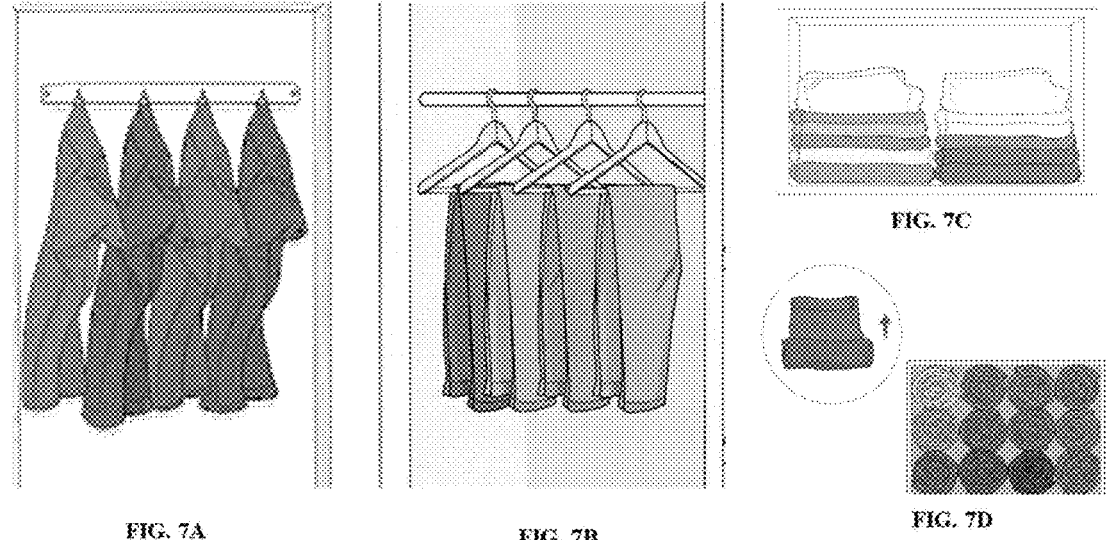
FIGS. 7A, 7B, 7C and 7D illustrate sticky product placement of products (apparels) onto plurality of fixtures, in accordance with some embodiments of the present disclosure.

The product selection near fixture snap points is a unique feature in a way that it just not locates the product on the store layout but allows the user/merchandizer to actually place the product onto the fixture in a manner similar to the actual placement in the store. The product selection near fixture snap points provides sticky product placement which facilitate product placement exactly at the similar place the way it is to be placed in the store; and exactly in the similar manner the way it is to be placed in the store. The sticky product placement is facilitated by drag and drop features wherein the fixtures and the products can be arranged in the 3D layout of the shopfloor for seamless floor planning, which takes the user friendliness of the solution to another level altogether. The sticky product placement ensures that the product is not just floating around on the screen but is assigned to a specific spot on the fixture of choice. Furthermore, depending on the fixture attribute, the product gets placed accordingly. As illustrated in FIG. 7A, the sticky product placement model provides an option to hung the pants on the hooks one after the other in an open position. Alternatively, as shown in FIG. 7B, same pants may be hung on an individual hanger such that middle part of the pants is kept on the hanger rod so that pants get divided equally on both side of the rod. Another possibility of placing the pants is by way of folding the pants (e.g. 3 folds or 4 folds) and stacking them one onto another as shown in FIG. 7C. Alternatively, same pants may be rolled up and staked adjacent to each other and the piled up as shown in FIG. 7D.

FIGS. 8A-8D illustrate three-dimensional (3D) mesh creation and product variation, in accordance with some embodiments of the present disclosure.

Figures 8A, 8B, 8C, 8D:
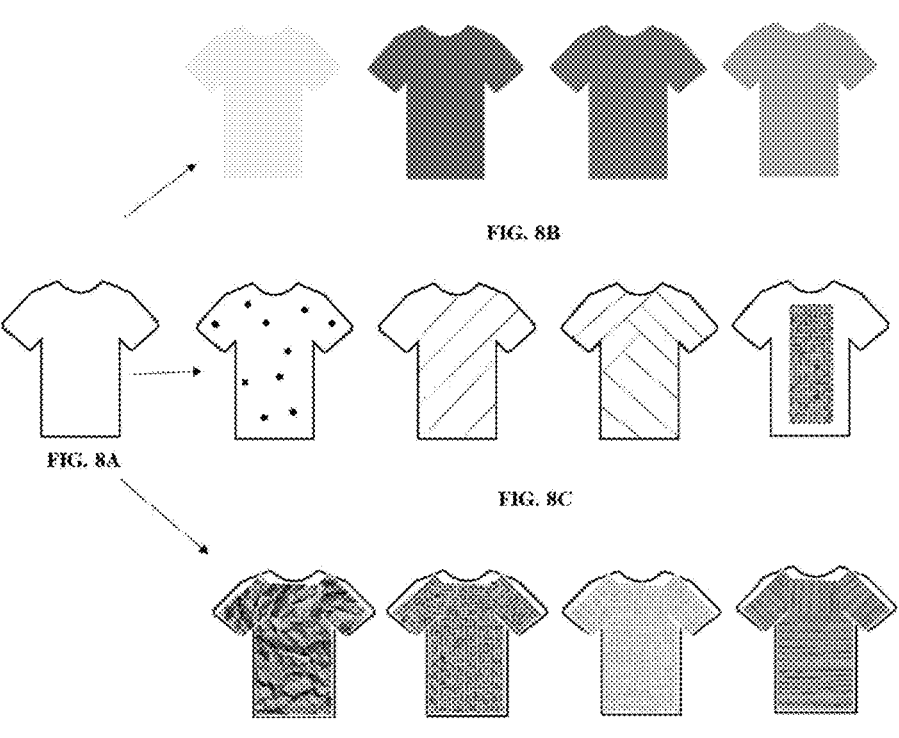
FIGS. 8A, 8B, 8C and 8D illustrate three-dimensional (3D) mesh for color, pattern, and texture application at the time of product placement onto fixtures, in accordance with some embodiments of the present disclosure.

As shown in FIG. 8A, a mesh of an apparel having outline with transparent base is selected from the product library. FIG. 8B shows apparel cloning in various colors. Based on inventory information and digital store handbook, the user/merchandizer may select the colors for an apparel to be placed in the store by clicking on the apparel mesh and then selecting the color from the color palette provided on the product selection module. FIG. 8C shows apparel cloning in various patterns. Based on inventory information and digital store handbook, the user/merchandizer may select the patterns for an apparel to be placed in the store by clicking on the apparel mesh and then selecting the pattern from the pattern palette provided on the product selection module. FIG. 8D shows texture cloning in various textures. Based on inventory information and digital store handbook, the user/merchandizer may select the texture for an apparel to be placed in the store by clicking on the apparel mesh and then selecting the texture from the texture palette provided on the product selection module.

Figure 9A:
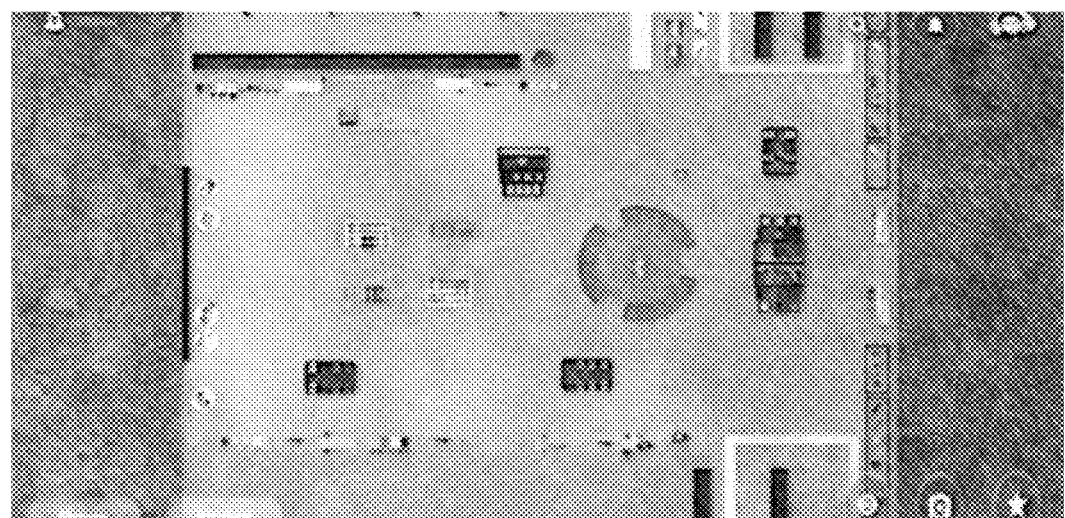
FIGS. 9A, 9B and 9C illustrate plurality of views of the 3D layout generated by the visualizer of the retail and space planning module, in accordance with some embodiments of the present disclosure.
Figure 9B:
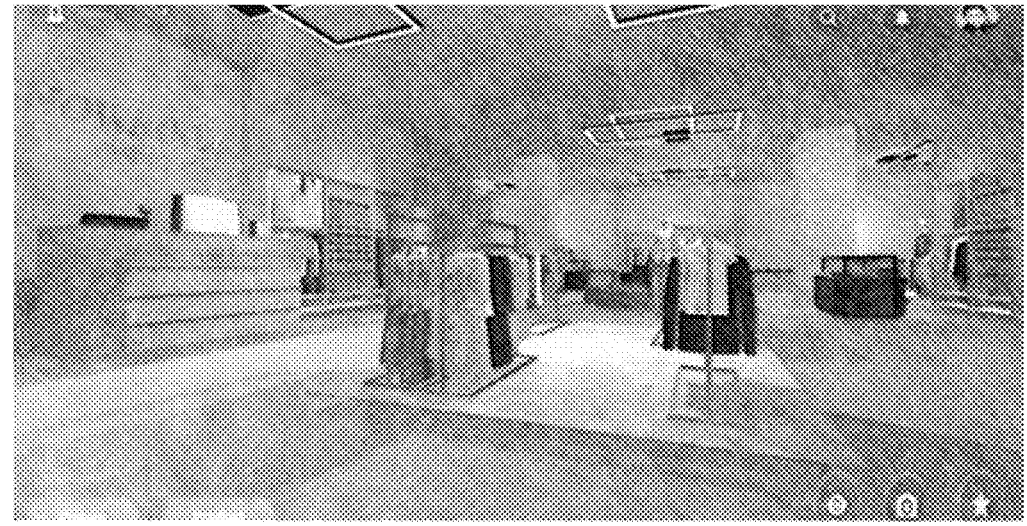
Figure 9C:
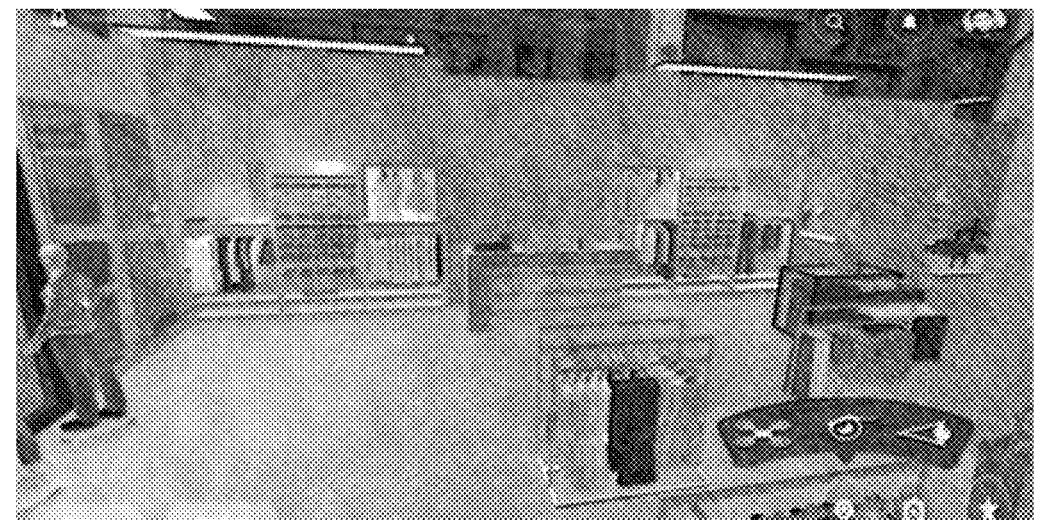

FIGS. 9A, 9B and 9C illustrate plurality of views of the 3D layout generated by the visualizer of the retail and space planning module, in accordance with some embodiments of the present disclosure.

As illustrated in FIGS. 9A, 9B and 9C, plurality of views is facilitated by the visualizer of the retail and space planning module 114. The plurality of views assists the user/merchandizer to visualize the store from all corners, all angles and also have a better perspective during planning phase. This can result in a much better 3D layout of the retail store. FIG. 9A is a drone view of the 3D layout generated by the retail and space planning module 114. FIG. 9B is a first-person view of the 3D layout generated by the retail and space planning module 114. FIG. 9C is a bird-eye view of the 3D layout generated by the retail and space planning module 114.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for three-dimensional (3D) merchandising and space planning comprising:

obtaining, via the one or more hardware processors, (a) fixture information about a plurality of fixtures from a fixture library wherein the fixture information comprises one or more attributes, capacity and usage detail of each of the plurality of fixtures, and (b) product information about a plurality of products from a product library wherein the product information comprises of one or more attributes, key performance indicators and quantity of each product among the plurality of products;

simultaneously receiving, by a central server, a real-time performance analytics data of the plurality of fixtures available in the store; and a real-time performance analytics data of the plurality of products in the store;

importing, via the one or more hardware processors, one or more 3D meshes of the plurality of products and the plurality of fixtures from the respective product library and the fixture library;

generating, via the one or more hardware processors, a 3D fixture placement layout for the retail store by arranging the plurality of 3D fixture mesh on the selected floor plan of the retail store, wherein the 3D fixture mesh selection is based on the acquired real-time performance analytics data of the performance of the 3D fixtures;

substantiating, via the one or more hardware processors, the imported 3D product mesh to be placed onto the 3D fixtures, by colors, patterns, and textures based on real-time performance analytics data of the performance of the 3D products;

loading, via the one or more hardware processors the substantiated 3D products onto the 3D fixtures using a sticky placement algorithm;

generating, via the one or more hardware processors, a 3D retail store layout for the retail store using a visualizer; and securing, via the one or more hardware processors, the 3D retail store layout in an editable form by providing an access control check on the 3D retail store layout.

2. The processor implemented method of claim 1, wherein the real-time performance analytics data is acquired from at least one type of sensor employed within the retail store, the at least one type of sensor comprising cameras, shelving unit sensors, proximity sensors, weight sensors, seismic sensors, IOT sensors, wireless sensors, and RFID (Radio-frequency identification) sensors.

3. The processor implemented method of claim 1, wherein the real-time performance analytics data is acquired from a Point-Of-Sale (POS) data from the respective store.

4. The processor implemented method of claim 1, wherein the product library provides three dimensional virtual objects to be placed in the retail store, and wherein the fixture library provides three dimensional fixtures to be placed in the retail store.

5. The processor implemented method of claim 1, wherein the 3D fixture placement layout is generated in monochrome using the 3D fixture mesh imported from the fixture library and in a chromatic theme wherein the 3D fixture mesh is substantiated with a plurality of colors, patterns, and textures after importing the 3D fixture mesh from the fixture library.

6. A system, comprising:

a memory storing instructions;

one or more communication interfaces; and one or more hardware processors coupled to the memory via the one or more communication interfaces, wherein the one or more hardware processors are configured by the instructions to:

obtain (a) fixture information about a plurality of fixtures from a fixture library wherein the fixture information comprises one or more attributes, capacity and usage detail of each of the plurality of fixtures, and (b) product information about a plurality of products from a product library wherein the product information comprises of one or more attributes, key performance indicators and quantity of each product among the plurality of products;

simultaneously receive by a central server, a real-time performance analytics data of the plurality of fixtures available in the store; and a real-time performance analytics data of the plurality of products in the store;

import one or more 3D meshes of the plurality of products and the plurality of fixtures from the respective product library and the fixture library;

generate a three-dimensional fixture placement layout for the retail store by arranging the plurality of 3D fixture mesh on the selected floor plan of the retail store, wherein the 3D fixture mesh selection is based on the acquired real-time performance analytics data of the performance of the 3D fixtures;

substantiate the imported 3D product mesh to be placed onto the 3D fixtures, by colors, patterns, and textures based on real-time performance analytics data of the performance of the 3D products;

load the substantiated 3D products onto the 3D fixtures using a sticky placement algorithm;

generate a 3D retail store layout for the retail store using a visualizer; and secure the 3D retail store layout in an editable form by providing an access control check on the 3D retail store layout.

7. The system of claim 6, wherein the real-time performance analytics data is acquired from at least one type of sensor employed within the retail store, the at least one type of sensor comprising cameras, shelving unit sensors, proximity sensors, weight sensors, seismic sensors, IOT sensors, wireless sensors, and RFID (Radio-frequency identification) sensors.

8. The system of claim 6, wherein the real-time performance analytics data is acquired from a Point-Of-Sale (POS) data from the respective store.

9. The system of claim 6, wherein the product library provides three dimensional virtual objects to be placed in the retail store, and wherein the fixture library provides three dimensional fixtures to be placed in the retail store.

10. The system of claim 6, wherein the three-dimensional fixture placement layout is generated in monochrome using 3D fixture mesh imported from the fixture library and in a chromatic theme wherein the 3D fixture mesh is substantiated with plurality of colors, patterns, and textures after importing the 3D fixture mesh from the fixture library.

11. One or more non-transitory machine-readable information storage mediums comprising one or more instructions which when executed by one or more hardware processors cause:

obtaining (a) fixture information about a plurality of fixtures from a fixture library wherein the fixture information comprises one or more attributes, capacity and usage detail of each of the plurality of fixtures, and (b) product information about a plurality of products from a product library wherein the product information comprises of attributes one or more key performance indicators and quantity of each product among the plurality of products;

simultaneously receiving, by a central server, a real-time performance analytics data of the plurality of fixtures available in the store; and a real-time performance analytics data of the plurality of products in the store;

importing one or more 3D meshes of the plurality of products and the plurality of fixtures from the respective product library and the fixture library;

generating a 3D fixture placement layout for the retail store by arranging the plurality of 3D fixture mesh on the selected floor plan of the retail store, wherein the 3D fixture mesh selection is based on the acquired real-time performance analytics data of the performance of the 3D fixtures;

substantiating the imported 3D product mesh to be placed onto the 3D fixtures, by colors, patterns, and textures based on real-time performance analytics data of the performance of the 3D products;

loading the substantiated 3D products onto the 3D fixtures using a sticky placement algorithm;

generating a 3D retail store layout for the retail store using a visualizer; and securing the 3D retail store layout in an editable form by providing an access control check on the 3D retail store layout.

12. The one or more non-transitory machine-readable information storage mediums of claim 11, wherein the real-time performance analytics data is acquired from at least one type of sensor employed within the retail store, the at least one type of sensor comprising cameras, shelving unit sensors, proximity sensors, weight sensors, seismic sensors, IOT sensors, wireless sensors, and RFID (Radio-frequency identification) sensors.

13. The one or more non-transitory machine-readable information storage mediums of claim 11, wherein the real-time performance analytics data is acquired from a Point-Of-Sale (POS) data from the respective store.

14. The one or more non-transitory machine-readable information storage mediums of claim 11, wherein the product library provides three dimensional virtual objects to be placed in the retail store, and wherein the fixture library provides three dimensional fixtures to be placed in the retail store.

15. The one or more non-transitory machine-readable information storage mediums of claim 11, wherein the 3D fixture placement layout is generated in monochrome using the 3D fixture mesh imported from the fixture library and in a chromatic theme wherein the 3D fixture mesh is substantiated with a plurality of colors, patterns, and textures after importing the 3D fixture mesh from the fixture library.

* * * * *